Figure 1:
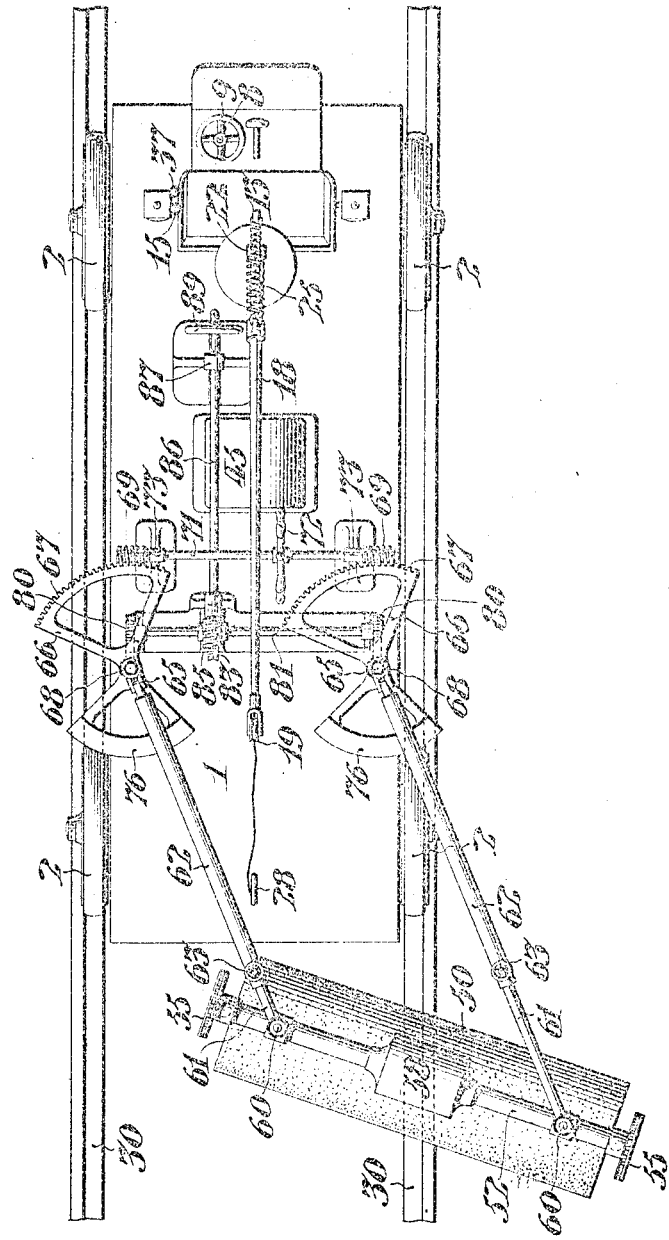

No. 871,512. PATENTED NOV. 19, 1907.
J. LEDWINKA.
SWEEPING MACHINE.
APPLICATION FILED JUNE 28, 1906.

2 SHEETS—SHEET 1.

WITNESSES:

INVENTOR:
JOSEPH LEDWINKA,

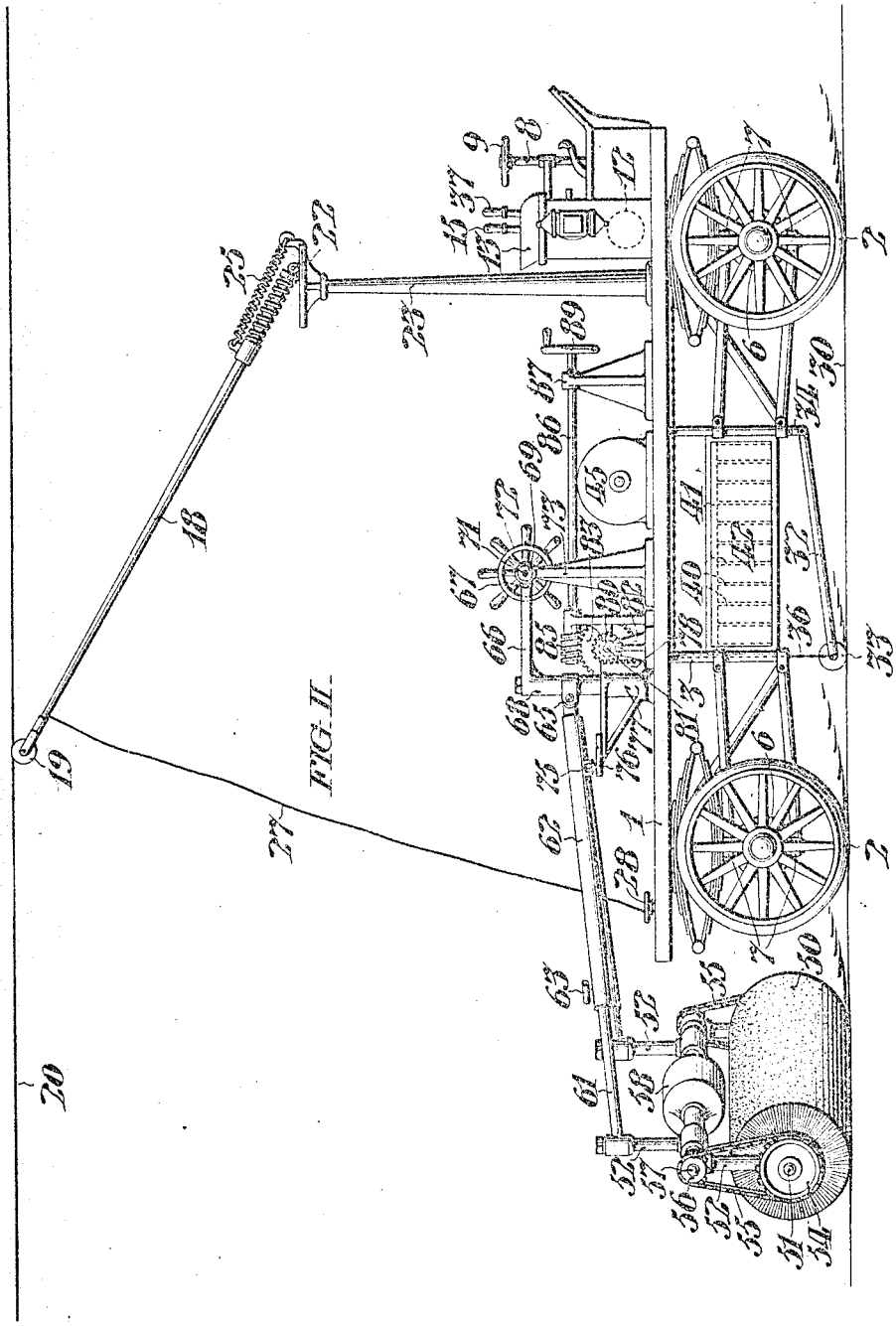

UNITED STATES PATENT OFFICE.

JOSEPH LEDWINKA, OF PHILADELPHIA, PENNSYLVANIA, ASSIGNOR TO RUSSELL THAYER, OF PHILADELPHIA, PENNSYLVANIA.

SWEEPING-MACHINE.

No. 871,512.　　　Specification of Letters Patent.　　　Patented Nov. 19, 1907.

Application filed June 28, 1906. Serial No. 323,859.

*To all whom it may concern:*

Be it known that I, JOSEPH LEDWINKA, of Philadelphia, in the county of Philadelphia and State of Pennsylvania, have invented certain new and useful Improvements in Sweeping-Machines, whereof the following is a specification, reference being had to the accompanying drawings.

My improvements relate to an electrically propelled vehicle which derives its motor current alternately from an external supply system and from a storage battery carried by said vehicle.

In the form of my invention herein described the vehicle is constructed and arranged to coöperate with a railway supply system, whose electric circuit includes an overhead supply wire, and a subjacent track. Said vehicle is provided with wheels which support it on said track while the vehicle motors are in electrical connection therewith, such connection being effected through a trolley pole adapted to engage an overhead wire, and through contact wheels which may be raised and lowered to break or make connection with said track.

It is the object of my invention to provide a vehicle of the class contemplated with sweeping mechanism, comprising a rotary brush operatively connected with an electric motor, and arranged to sweep the surface traversed by the vehicle. As hereinafter described, the sweeping mechanism comprises improved means to raise and lower said brush and to adjust it angularly and laterally with respect to the vehicle, so as to sweep the surface upon either side of said track without digressing from the latter. I also find it convenient to provide said supporting wheels with individual motors local to the respective wheels, and to so arrange the electrical circuits in the vehicle that all of the motors are connected in series relation when operated by the external supply system, and in parallel relation when operated by the internal battery supply system.

My invention comprises the various novel features of construction and arrangement hereinafter more definitely specified.

In the drawings, Figure I, is a plan view of a vehicle conveniently embodying my invention. Fig. II, is a side elevation of said vehicle.

In said figures; the vehicle comprises the platform 1, connected with the supporting wheels 2, by the frame 3. Each of said wheels 2, has an individual motor 6, and each wheel and its motor may be turned in a horizontal plane upon vertically disposed trunnions in bearings 7, on said frame. Said wheels 2, are coupled in pairs at the respectively opposite ends of the vehicle and may be dirigible by any convenient means, to determine the direction of progression of the vehicle, when it is desired to digress from said track, for instance, such means may comprise the vertical shaft 8, and hand wheel 9. Said motors 6, may be electrically connected either in series or parallel relation with each other by means of a controller 12, which is conveniently located beneath the chauffeur's seat 13, and comprises the operating lever 15. Said controller 12, is electrically connected with the pole 18, provided with the trolley 19, for electrical connection with the overhead supply wire 20. Said pole 18, is pivoted at 22, on the column 23, which is supported by the platform 1, and through which electrical connection is made with the controller 12. Said pole 18, is provided with the spring 25, which tends to normally uplift said pole into engagement with said supply wire 20. However, said pole may be lowered and maintained depressed by the rope 27, which may be detachably secured to the cleat 28, on said platform 1.

The electric circuit of the railway supply system with which said vehicle is arranged to coöperate, includes the subjacent track comprising the parallel rails 30, and, said vehicle is arranged to make electrical connection with said rails 30, by means of the vertically oscillatory frame 32, which carries a pair of contact wheels 33, arranged to register with the respective rails. Said frame 32, being connected with the vehicle frame 3, by the swivel joint 34, is so constructed, and arranged that it may also oscillate horizontally to retain electrical connection with the rails while the vehicle is traversing curved sections of track; etc. Said electrical contact frame 32, and wheels 33, may be alternately raised and lowered by means of the flexible connector 36, which is operatively connected with the lever 37. It is to be understood that said contact devices, comprising the trolley pole 18, and frame 32, are only utilized when the vehicle is in connection with the external supply system. When it is desired to electrically disconnect the vehicle from the external supply system; said pole 18, is lowered and the frame 32, uplifted, and contemporaneously operative switch mechanism adjunctive to the controller 12, changes the connections from the external supply circuit to the internal supply circuit so as to include the batteries 40, in connection with said motors 6. Said batteries 40, are conveniently located in the receptacle 41, in the frame 3, which is conveniently provided with the door 42, so that said batteries may be readily accessible. Said storage battery 40, is connected by the controller 12, with the secondary coil of a transforming device indicated at 45, which may be a dynamotor or motor-generator arranged to take a primary direct current from the railway supply system, at 500 volts and to generate a secondary direct current at say 125 volts, to supply said storage battery and the four motors 6. The circuit of said transforming device also includes an iron resistance medium which by reason of its natural increase in resistance in correspondence with any increase in its temperature, automatically checks any tendency of the current to suddenly increase, and, the arrangement contemplated has the effect of maintaining the current in the secondary circuit approximately constant, thus enabling the vehicle motors 6, to operate at constant speed by current derived from a fluctuating supply circuit.

Said platform 1, also supports a sweeping device comprising the rotary brush 50, carried by the shaft 51, which is journaled in the frame 52. Said shaft 51, is provided at its opposite ends with the sprocket wheels 54, connected by the chains 55, with sprocket wheels 56, on the shaft 57, in operative connection with the motor 58, whose casing is secured in rigid relation with said frame 52. Said motor 58, of the sweeping device, is also in operative connection with the dynamotor or other transforming device 45, and with the controller 12, so that its operation may be controlled contemporaneously with and independently of the control of the motors 6. Said frame 52, is pivotally connected at 60, with two arms comprising the members 61, and 62, the former being fitted to slide longitudinally in the latter, being secured in any desired position of adjustment by the set screw 63. Said arm members 62, are respectively pivoted at 65, in rotary bearings 66, provided with sectoral worm gears 67, and mounted to oscillate upon the vertical standards 68, which are in rigid relation with said platform 1. Said worm gears 67, are engaged by the worm 69, on the shaft 71, which latter is provided with the hand wheel 72, and supported by the brackets 73, upon said platform 1. Each of said arm members 62, is provided with a roller 75, journaled upon its lower side and arranged to traverse respective sectoral plates 76, which are carried by the sleeves 77, which are mounted to reciprocate vertically upon said standards 68, and are provided with racks 78, for engagement with the gear wheels 80, carried by the shaft 81, which is mounted to rotate in the bearings 82. Said shaft 81, is provided intermediate of its length with the worm gear wheel 83, engaged by the worm 85, which is carried by the shaft 86, mounted to rotate in the bearings 87, and provided with the hand wheel 89.

The arrangement above described is such that in accordance with the direction of rotation of the hand wheel 89, whereby the plates 76, are raised or lowered, the brush 50, may be raised or lowered with respect to the surface traversed by the vehicle. Said brush 50, may also be adjusted to sweep upon either side of the tracks 30, in accordance with the rotary position of adjustment of the worm gears 67, which carry the arms 62, etc., and which adjustment may be effected in either direction in accordance with the rotation of the hand wheel 72. Moreover, said brush may be inclined to sweep toward or away from the tracks 30, in accordance with the set of the relatively movable members 61, and 62, of the arms.

It is to be understood that I do not desire to limit myself to the precise details of construction and arrangement herein set forth, as various modifications may be made therein without departing from the essential features of my invention.

I claim:—

1. The combination with vertical standards; of arms pivotally supported on said standards; a frame carried by the free ends of said arms; a brush wheel mounted to rotate in said frame; a countershaft in said frame; a motor operatively related to said countershaft; and, means arranged to adjustably vary the length of said arms, substantially as set forth.

2. The combination with vertical standards; of arms pivotally supported on said standards; a frame carried by the free ends of said arms; a brush wheel mounted to rotate in said frame; a countershaft in said frame; a motor operatively related to said countershaft; and, means arranged to raise and lower said arms with respect to said vehicle, comprising a sectoral plate mounted for vertical reciprocation on one of said standards and carrying a rack; and, a gear wheel operatively connected with said rack, substantially as set forth.

3. The combination with vertical standards; of arms pivotally supported in rotary bearings on said standards; worm gear sectors rigidly connected with said rotary bearings; worms rigidly connected with a common shaft and respectively in operative relation with said sectors; sectoral plates arranged to support said arms, carried by respective sleeves mounted to reciprocate on said standards and provided with racks; gear wheels rigidly connected with a common shaft and respectively in operative relation with said racks; a worm in operative relation with the last named shaft; a frame carried by the free ends of said arms; a brush wheel mounted to rotate in said frame; a countershaft in said frame; and, a motor operatively related to said countershaft, substantially as set forth.

4. The combination with vertical standards; of arms pivotally supported on said standards and comprising longitudinally adjustable members; a frame carried by the free ends of said arms; a brush wheel mounted to rotate in said frame; and, a motor operatively related to said brush wheel, substantially as set forth.

5. The combination with vertical standards; of an arm supported on said standards; arranged to oscillate vertically and horizontally; a frame carried by the free ends of said arm; a brush wheel mounted to rotate in said frame; and, a motor operatively connected with said brush wheel, substantially as set forth.

6. The combination with vertical standards; of arms pivotally supported on said standards and each comprising relatively adjustable members, whereby the length of said arms may be variably determined; a frame carried by the free ends of said arms; a brush wheel mounted to rotate in said frame; and, a motor operatively related to said brush wheel, substantially as set forth.

7. The combination with a brush wheel; of a motor operatively related to said wheel; and, means supporting said brush wheel from said vehicle adjustable vertically and horizontally to determine the position of said brush wheel, substantially as set forth.

8. The combination with a brush wheel; of a motor operatively connected with said brush wheel; an arm supporting said brush wheel; a worm gear sector operatively connected with said arm; and, a worm engaging said sector, substantially as set forth.

9. The combination with a brush wheel; of a motor operatively related to said brush wheel; an arm carrying said brush wheel and pivotally supported on said vehicle; and, means, independent of the pivotal connection of said arm, arranged to raise and lower the latter, comprising a vertically adjustable sleeve, substantially as set forth.

10. The combination with a brush wheel; of a motor operatively related to said brush wheel; an arm carrying said brush wheel and pivotally supported on said vehicle; and, means, independent of the pivotal connection of said arm, arranged to raise and lower the latter, comprising a vertically adjustable sleeve provided with a rack, substantially as set forth.

11. The combination with a vehicle; of arms pivotally supported on said vehicle; a frame carried by the free ends of said arms; a brush wheel mounted to rotate in said frame; and a motor carried by said frame, in operative relation with said brush wheel; said brush wheel and motor being movable by said arms relatively to said vehicle, substantially as set forth.

12. The combination with a vehicle; of arms pivotally supported on said vehicle; a frame carried by the free ends of said arms; a brush wheel mounted to rotate in said frame; a countershaft in said frame; a motor carried by said frame in operative relation with said countershaft; and means operatively connecting said countershaft with said brush wheel; said brush wheel and motor being movable by said arms relatively to said vehicle, substantially as set forth.

13. The combination with a vehicle; of arms pivotally supported on said vehicle, arranged to oscillate laterally with respect thereto; a frame carried by the free ends of said arms; a brush wheel mounted to rotate in said frame; and a motor operatively connected with said brush wheel, substantially as set forth.

14. The combination with a vehicle; of arms pivotally supported on said vehicle, arranged to oscillate laterally with respect thereto; a frame carried by the free ends of said arms; a brush wheel mounted to rotate in said frame; and a motor carried by said frame in operative relation with said brush wheel; said brush wheel and motor being movable by said arms relatively to said vehicle, substantially as set forth.

15. The combination with a vehicle; of arms pivotally supported on said vehicle to oscillate both vertically and horizontally; a frame carried by the free ends of said arms; a brush wheel mounted to rotate in said frame; and a motor operatively connected with said brush wheel, substantially as set forth.

16. The combination with a vehicle; of arms pivotally supported on said vehicle to oscillate both vertically and horizontally; a frame carried by the free ends of said arms; a brush wheel mounted to rotate in said frame; and a motor carried by said frame and operatively connected with said brush wheel, substantially as set forth.

17. The combination with a vehicle; of a brush wheel; a motor operatively connected with said brush wheel; and an arm connecting said brush wheel with said vehicle, comprising means whereby the effective length of said arm may be varied, substantially as set forth.

In testimony whereof, I have hereunto signed my name at Philadelphia, State of Pennsylvania, this 27th day of June 1906.

JOSEPH LEDWINKA.

Witnesses:
 AMBROSE F. FORD,
 JOSEPH R. GEORGE.